(12) United States Patent
    Kowalski

(10) Patent No.: US 10,684,056 B2
(45) Date of Patent: Jun. 16, 2020

(54) TEMPERATURE-CONTROLLED CRADLE

(71) Applicant: Comfort Innovations LLC, Lakeland, FL (US)

(72) Inventor: Wendy Kowalski, Lakeland, FL (US)

(73) Assignee: Comfort Innovations LLC, Lakeland, FL (US)

( * ) Notice: Subject to any disclaimer, the term of this patent is extended or adjusted under 35 U.S.C. 154(b) by 116 days.

(21) Appl. No.: 15/968,418

(22) Filed: May 1, 2018

(65) Prior Publication Data
    US 2019/0041116 A1    Feb. 7, 2019

Related U.S. Application Data

(60) Provisional application No. 62/492,380, filed on May 1, 2017.

(51) Int. Cl.
    *F25D 11/00*    (2006.01)
    *A61G 13/00*    (2006.01)
    *A61G 17/00*    (2006.01)

(52) U.S. Cl.
    CPC ........ *F25D 11/003* (2013.01); *A61G 13/0027* (2013.01); *A61G 17/002* (2013.01); *A61G 2200/14* (2013.01)

(58) Field of Classification Search
    CPC . F25D 11/003; A61G 13/0027; A61G 17/002; A61G 2200/14; A61G 11/00; A61G 2210/70
    See application file for complete search history.

(56) References Cited

U.S. PATENT DOCUMENTS

| 6,625,852 B1 | 9/2003 | Hanson | |
| 2009/0112368 A1* | 4/2009 | Mann, III | B64F 1/34 700/275 |
| 2016/0051403 A1* | 2/2016 | Thomas | A61G 11/00 607/112 |

FOREIGN PATENT DOCUMENTS

| CN | 205180922 U |   | 4/2016 |
| GB | 1501281 A | * | 2/1978 |
| GB | 1501281 A |   | 2/1978 |
| JP | S48102000 U |   | 11/1973 |
| JP | 2013034709 A |   | 2/2013 |

OTHER PUBLICATIONS

International Search Report and Written Opinion of International Searching Authority of International Application No. PCT/US2018/030503, dated Aug. 17, 2018.
Flexmort, CuddleCot system, webpage captured from flexmort.com/cuddle-cots/ on Oct. 10, 2019.
Flexmort, CuddleCot flyer, obtained from http://flexmort.com/wp-content/uploads/2012/12/CuddleCot-Flyer-2017.pdf on Oct. 11, 2019.

* cited by examiner

*Primary Examiner* — Elizabeth J Martin
(74) *Attorney, Agent, or Firm* — Bradley Arant Boult Cummings; Philip E. Walker; Timothy L. Capria

(57) ABSTRACT

A device for maintaining a deceased fetus or infant at a temperature lower than ambient for extending preservation of the fetus or infant includes a frame, a cooling unit operatively attached to the frame, a cradle sized to contain the deceased fetus or infant and operatively attached to the frame, and a power supply conduit. The frame has a top end and a bottom end. The cradle is thermally connected to the cooling unit, and a power supply conduit is connected to the cooling unit.

17 Claims, 12 Drawing Sheets

TEMPERATURE-CONTROLLED CRADLE

This is a non-provisional patent application claiming priority to U.S. Provisional Patent Application Ser. No. 62/492,380 filed May 1, 2017 and entitled "Temperature-Controlled Cradle".

This non-provisional patent application is filed by applicant Comfort Innovations LLC for the inventor Wendy Kowalski, a citizen of the United States, residing in Lakeland, Fla., for the invention of a "Temperature-Controlled Cradle".

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

All patents and publications described or discussed herein are hereby incorporated by reference in their entirety.

FIELD OF INVENTION

This invention relates to a temperature-controlled baby cradle, or bassinet. More specifically, the invention relates to a temperature-controlled baby cradle, or bassinet, that maintains a low temperature for extended preservation of a baby or infant who has died.

BACKGROUND OF THE DISCLOSURE

The loss of a baby, or infant, can be devastating for the parents. The death of a baby can be classified in two main areas—a pregnancy loss or an infant death. A "pregnancy loss" may be defined as a stillbirth, which is the birth of a baby, or infant, who has died in the womb any time after 20 weeks gestation (considered the age of fetal viability). The causes of death can range from, but are not limited to, genetic disorders, maternal disorders, placenta problems, cord knots or compressions, injury to the mother, injury to the baby, illnesses, and in some cases there are no known causes. "Infant death" refers to any baby who survived birth up through one year of age and then passes for any reason. Causes include, but are not limited to, congenital abnormality, prematurity, injury, illness, SIDS, accident, or other various causes.

Stillbirth is one of the most devastating of losses, affecting over 25,000 families each year. Stillbirth affects families of all races, religions, and socio-economic status. For many parents, stillbirth is a loss that hit unexpectedly—up to half of all stillbirths occur in pregnancies that had seemed problem-free.

Parents in these circumstances often desire an extended period of time to grieve the loss of their child in a comfortable, unhurried setting. However, past methods of addressing the matter have fallen short. Often the deceased baby is quickly removed to a morgue or stored in a cooler, or refrigeration device, in the hospital, such as a neonatal care unit. This interrupts the grieving process and lacks sensitivity. Using ice packs, dry ice, or chilled rice bags are a short-term solution, requiring restocking or re-chilling and sometimes the use of harmful chemicals, and result in significant temperature fluctuations and wetness due to melting. Similarly, turning the temperature down in the entire room is a short term solution that leads to temperature fluctuations and can make the entire room uncomfortable.

BRIEF SUMMARY

The present disclosure provides/relates generally to a device for maintaining a deceased fetus or infant at a temperature lower than ambient. The device comprises a frame having a top end and a bottom end, a cooling unit operatively attached to the frame, a cradle sized to contain the fetus or infant, operatively attached to the frame, and thermally connected to the cooling unit, and a power supply conduit connected to the cooling unit.

In various embodiments the frame can be a mobile cart and include movement devices positioned at the bottom end. The frame can include a plurality of panels positioned to contain the cooling unit, including one or more doors integrated with the panels.

In various embodiments, the cooling unit includes a compressor system, a condenser unit, an evaporator, and a thermostat. The condenser unit can include a metal coil surrounded with a plurality of metal fins to dissipate heat, wherein the metal coil can be made of copper and the fins can be made of aluminum. The cooling unit, such as the evaporator, can include a cooling surface that is in thermal contact with the cradle. The cooling unit can include a drain pan. Energy can be transmitted through the power supply conduit to the cooling unit and the power supply conduit is configured to transmit AC and DC current to the cooling unit.

The cradle can include a thermal conductive bottom section positioned to operatively engage a portion of the cooling unit and a cover.

The device can include at least one sensor positioned to determine the temperature in the cradle, wherein the sensor can be positioned in the cradle.

It is therefore a general object of the current disclosure to provide a cooling cradle used after a baby has passed to allow a period of grieving.

Another object of the current disclosure is to provide a system and method for maintaining a passed fetus or infant at a temperature below ambient.

Still another object of the current disclosure is to provide a mobile cooling cradle.

Other and further objects, features, and advantages of the present disclosure will be readily apparent to those skilled in the art upon reading of the following disclosure when taken in conjunction with accompanying drawings.

DETAILED DESCRIPTION OF EXEMPLARY EMBODIMENTS

Figure 1:
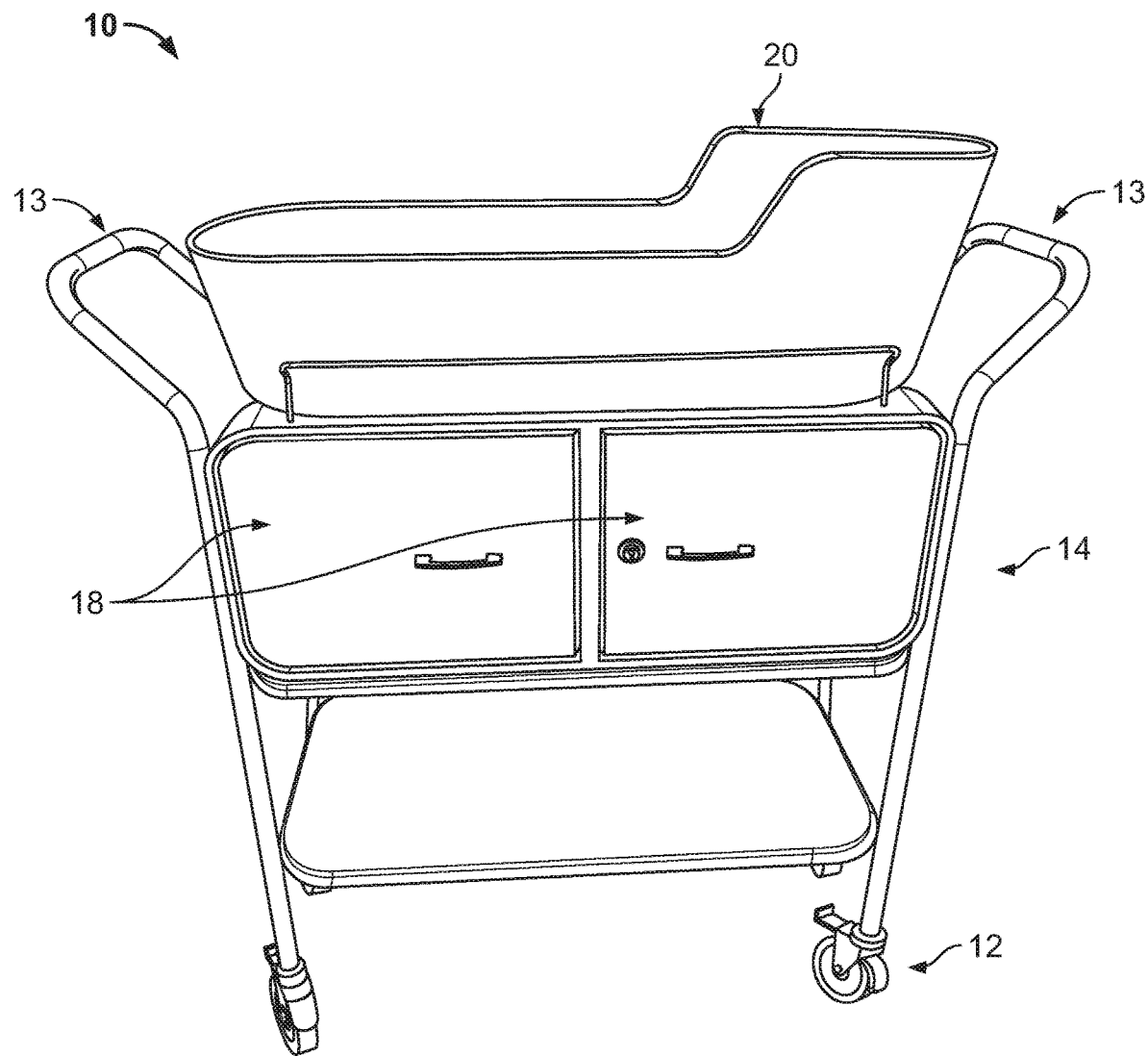
FIG. 1 shows a front perspective view of an apparatus in accordance with an embodiment of the present disclosure.
Figure 2:
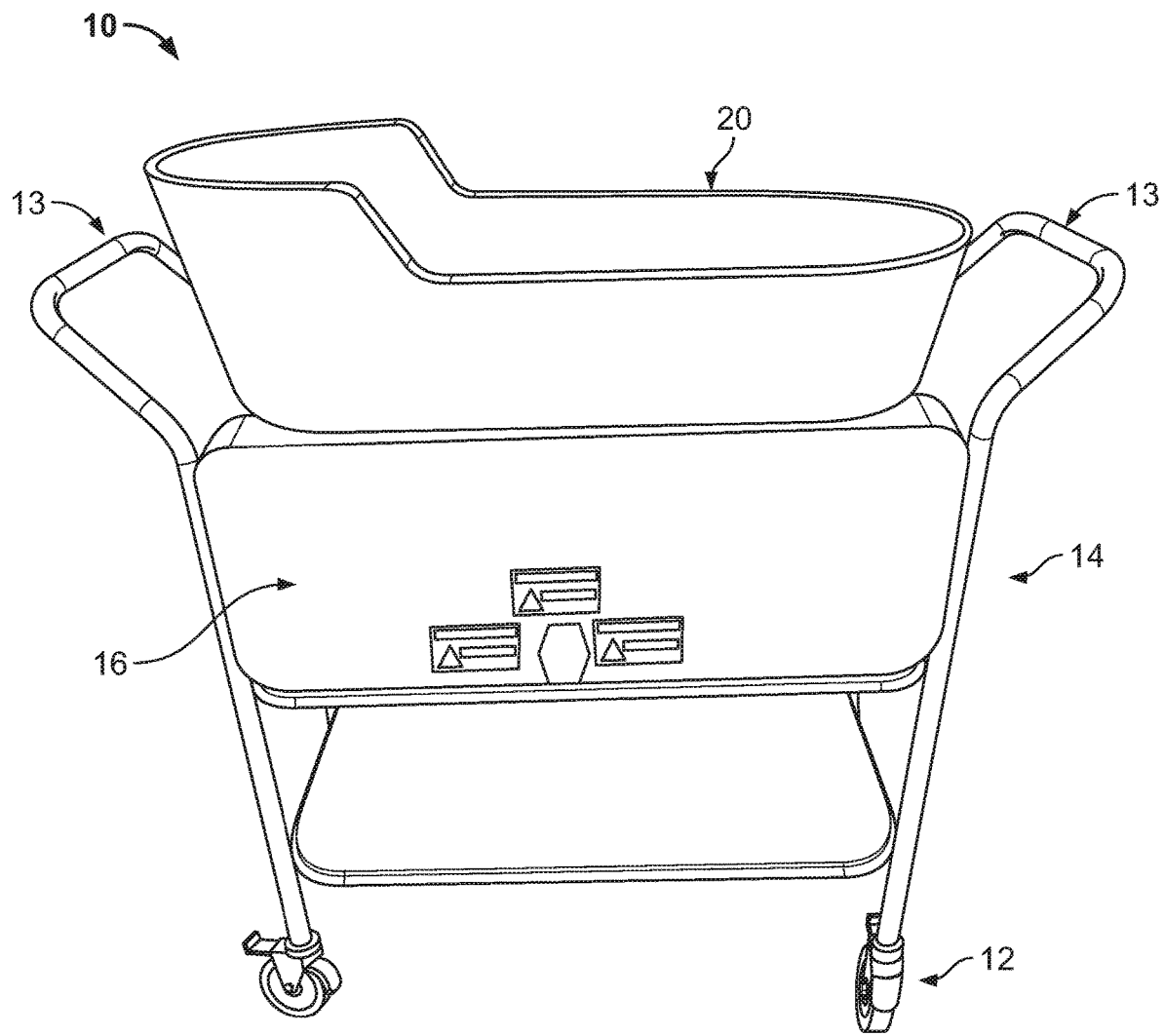
FIG. 2 shows a back perspective view of the apparatus in FIG. 1.
Figure 3:
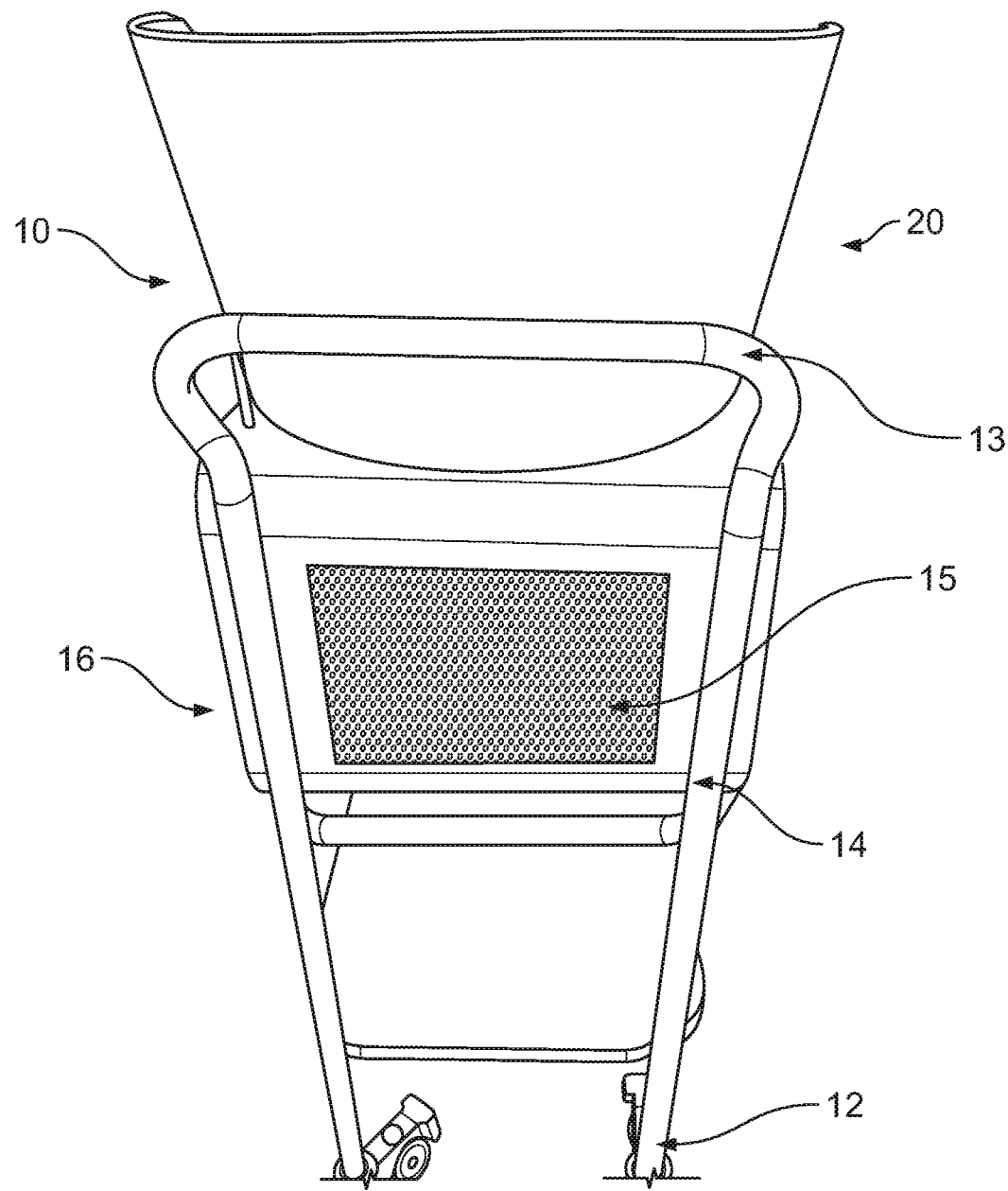
FIG. 3 shows a side view of the apparatus in FIGS. 1-2.
Figure 4:
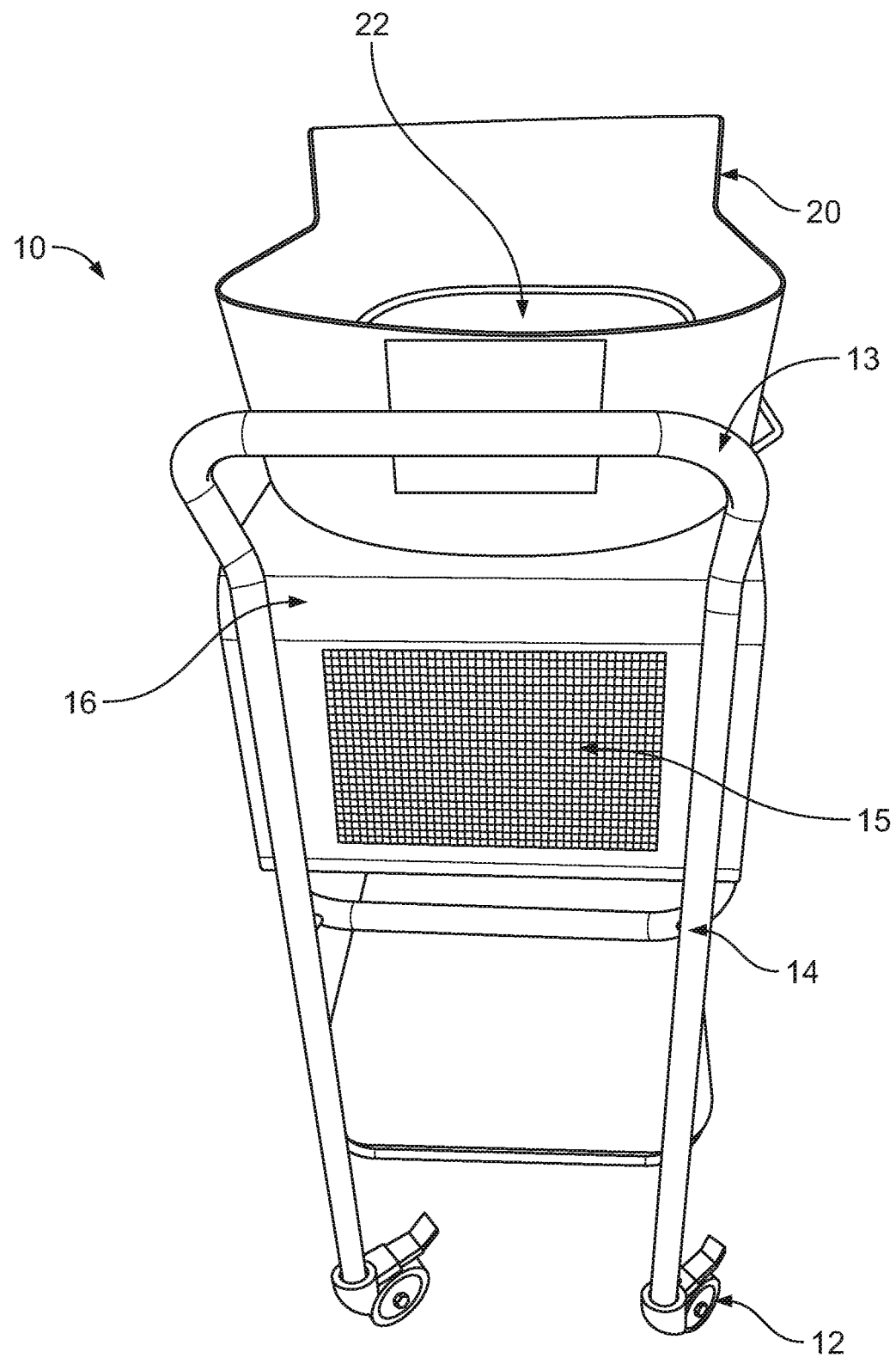
FIG. 4 shows an alternate side view of the apparatus in FIGS. 1-3.
Figure 5:
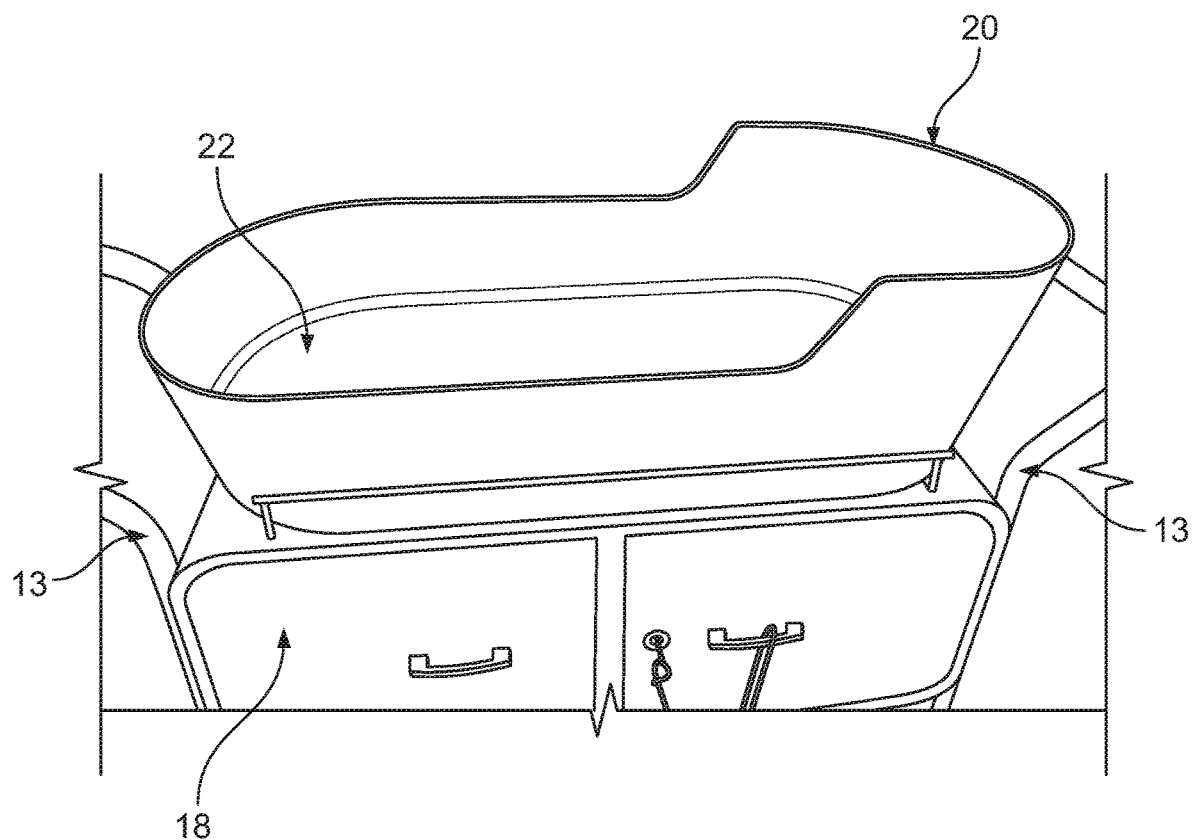
FIG. 5 shows an alternate front perspective view of the apparatus in FIGS. 1-4.
Figure 6:
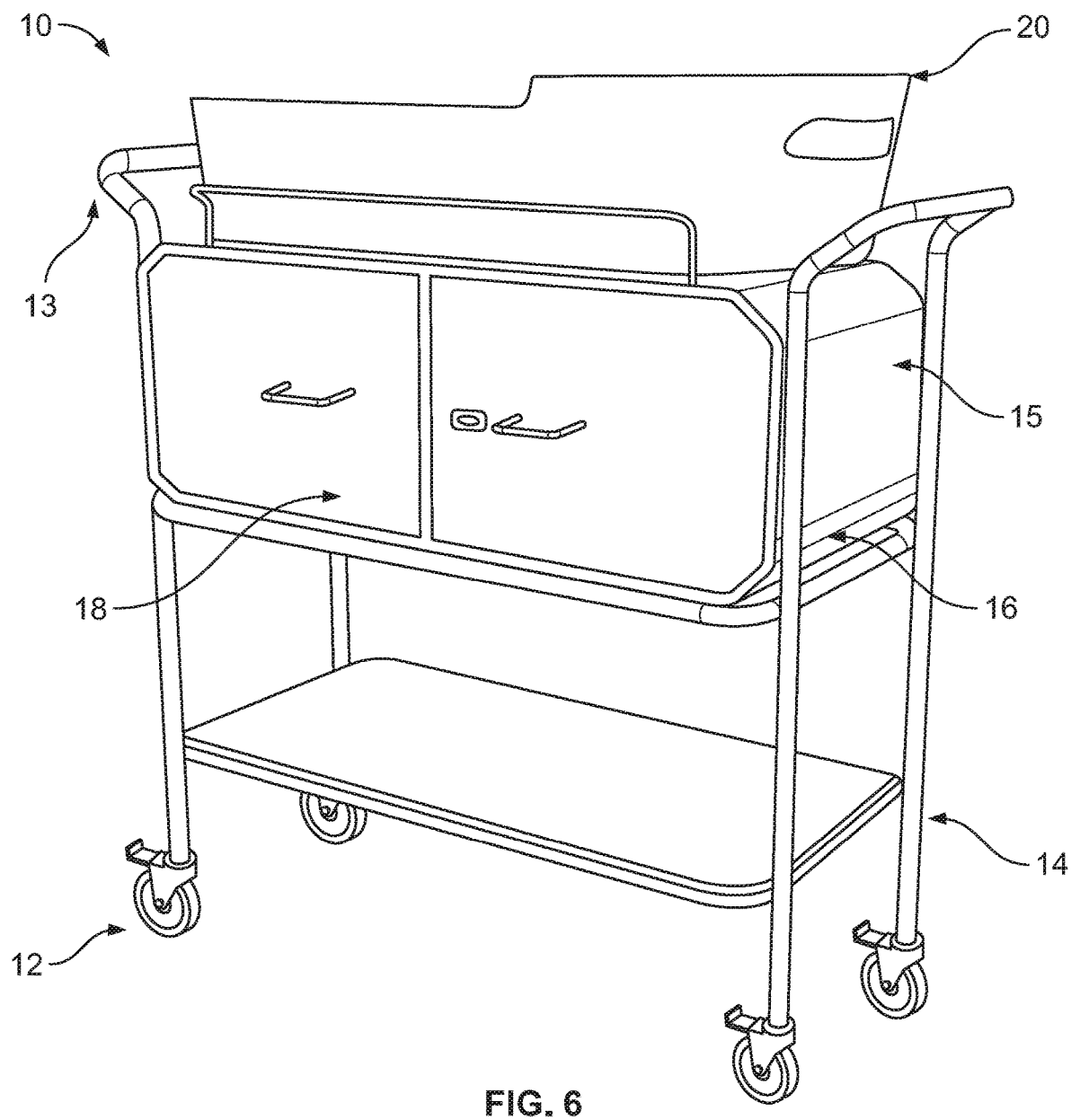
FIG. 6 shows an alternate front perspective view of an apparatus made in accordance with the current disclosure show a cover for the cradle portion.
Figure 7:
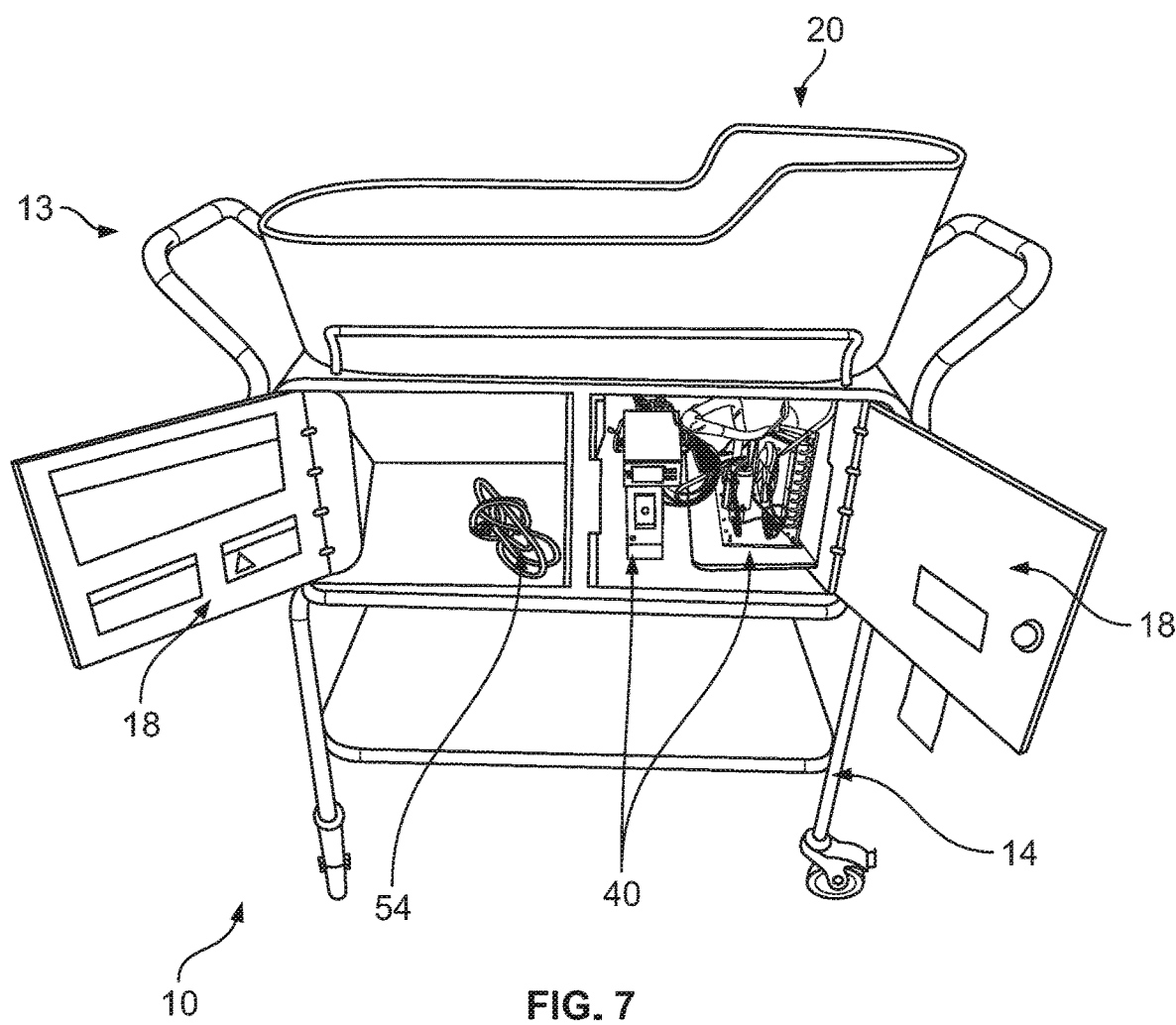
FIG. 7 shows a front perspective view of the apparatus of FIGS. 1-5 showing internal portions of the frame.
Figure 8:
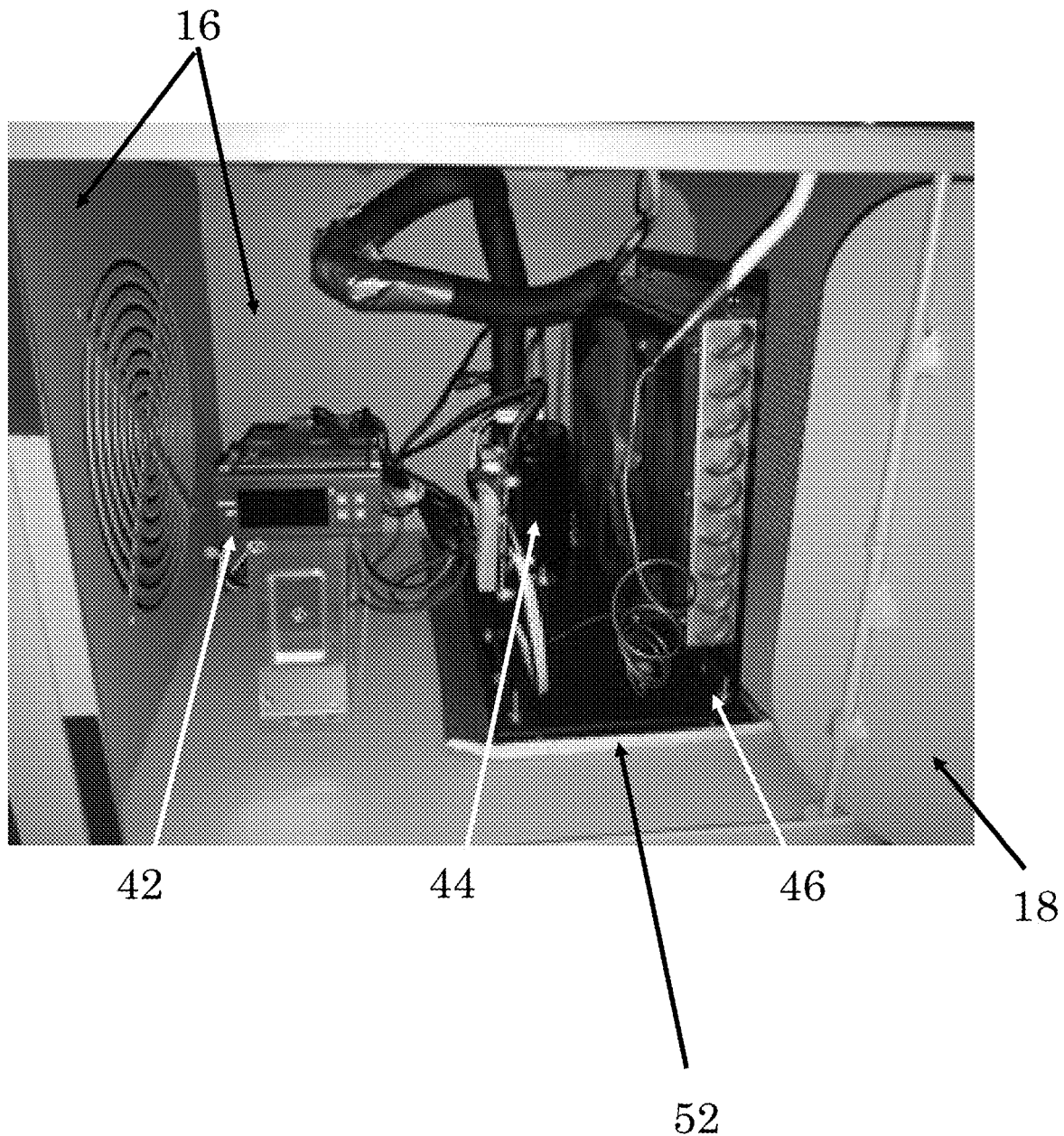
FIG. 8 shows a partial front perspective view of the apparatus of FIG. 7.
Figure 9:
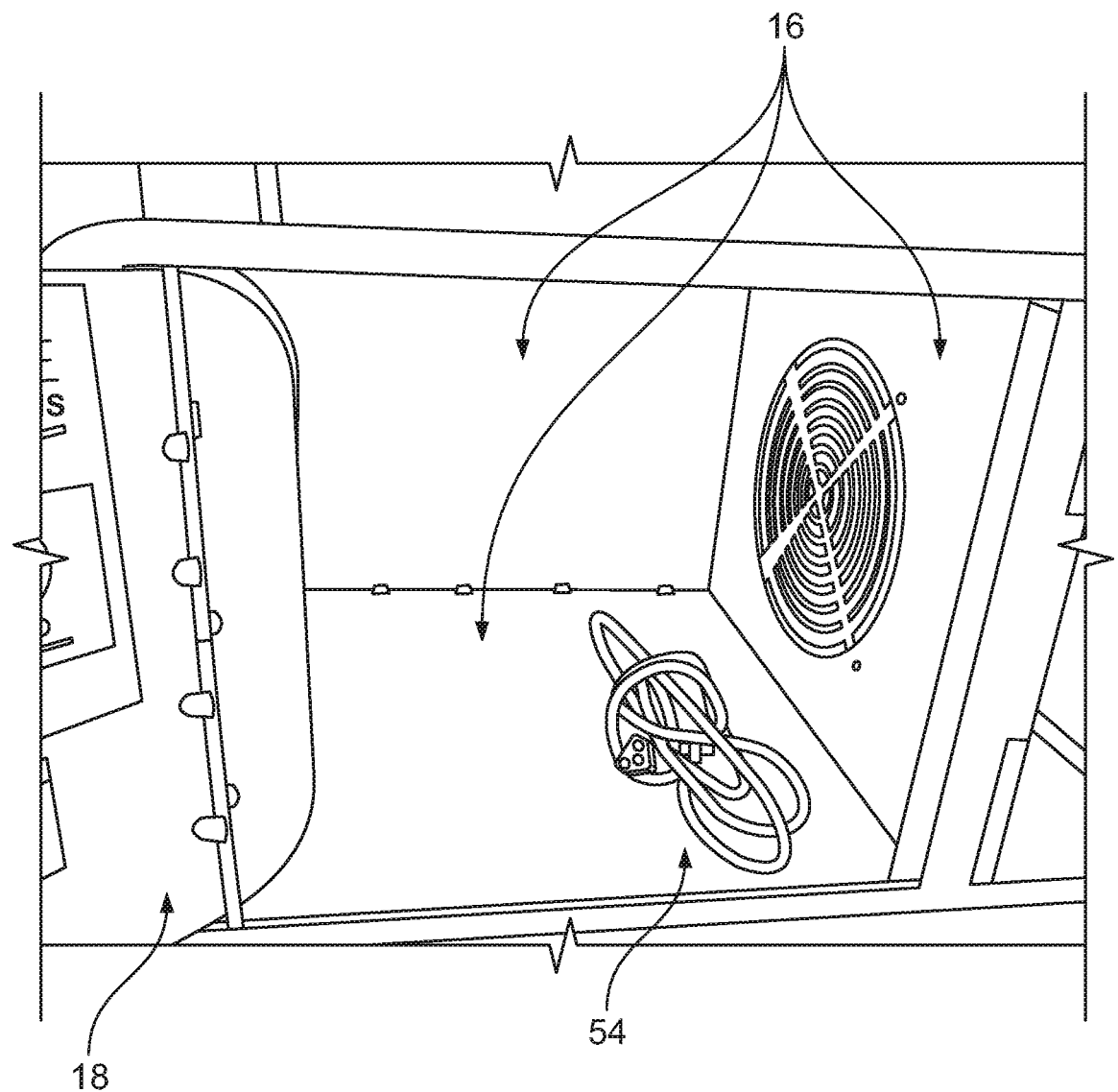
FIG. 9 shows a partial front perspective view of the apparatus of FIG. 7.
Figure 10:
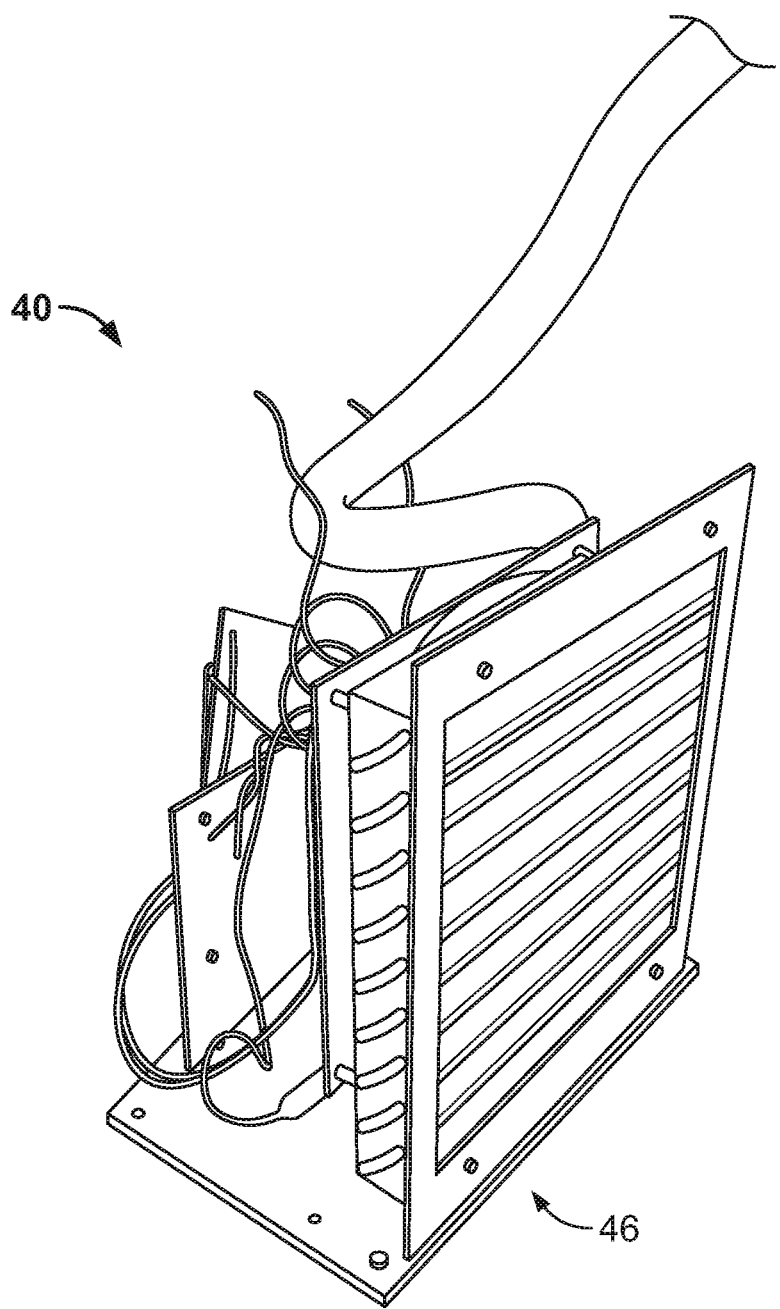
FIG. 10 shows an example of portions of a cooling unit made in accordance with the current disclosure.
Figure 11:
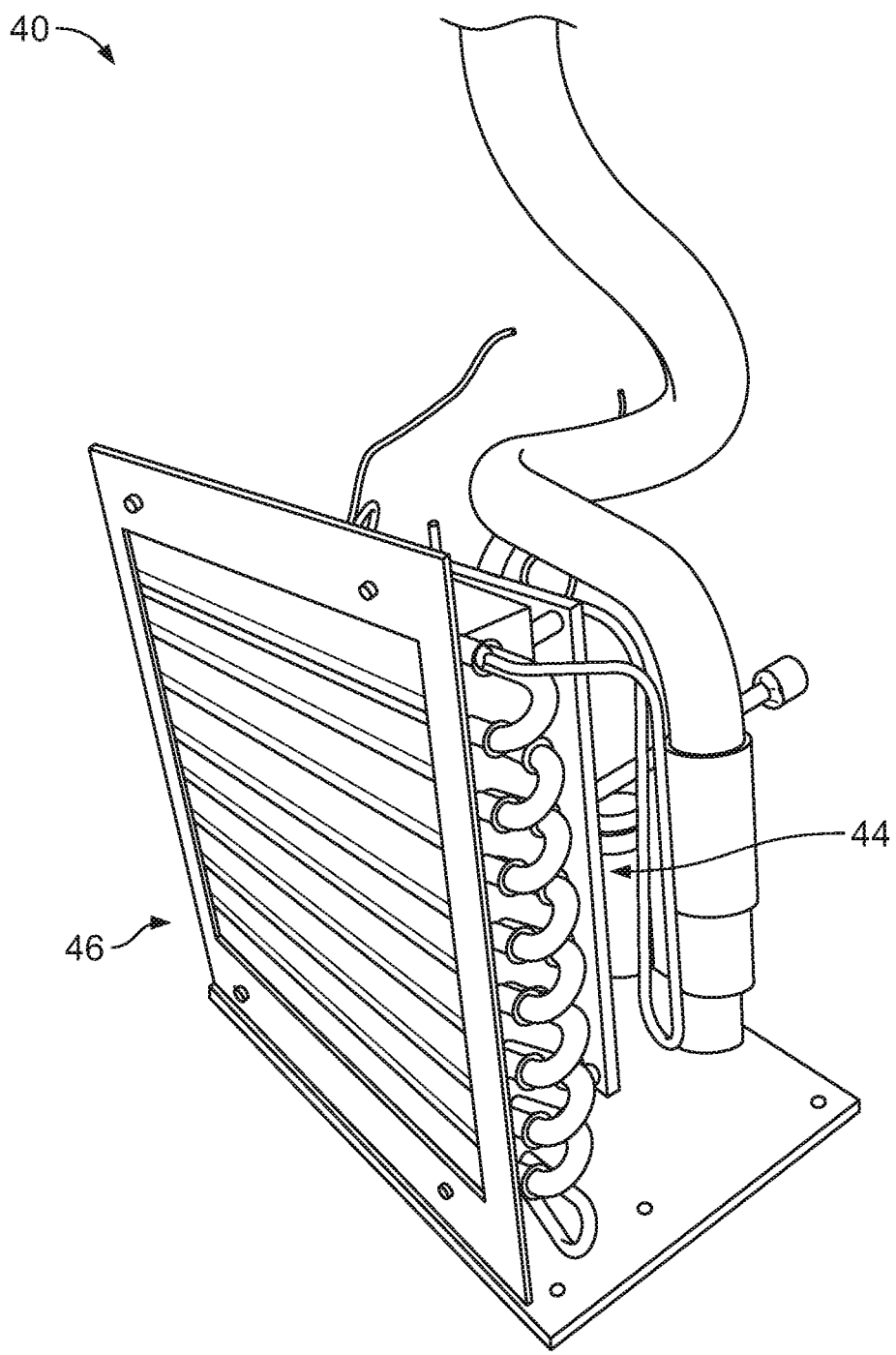
FIG. 11 shows an example of portions of a cooling unit made in accordance with the current disclosure.
Figure 12:
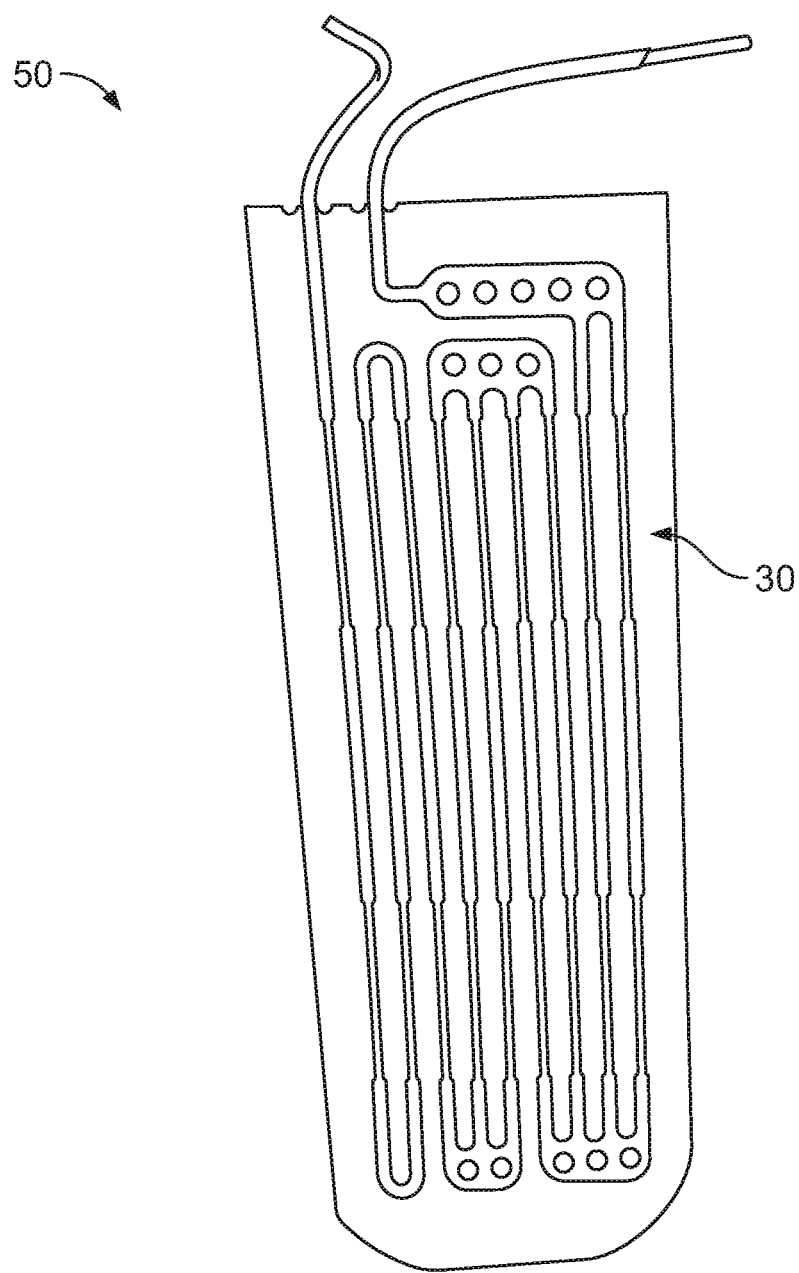
FIG. 12 shows an evaporator cooling surface plate made in accordance with the current disclosure.

In various exemplary embodiments, the present disclosure comprises a temperature-controlled baby apparatus or device. In several embodiments, the apparatus comprises a cart 10, having a frame 14 with a cradle 20, or bassinet 20, a compressor system 44, a copper coil surrounded with an aluminum finned condenser unit 46, evaporator 50 and base plate 30, drain pan 52, power supply conduit 54, and a thermostat 42 that will comprise the cooling unit 40 for the cart 10.

The unit 10 is preferably self-contained, mobile, and can be self-powered (e.g., battery) or powered by an electrical cord plugged into a standard power supply (e.g., 115V, 230V, or other standard voltage as used in various parts of the world). Operation is quiet or semi-quiet (as opposed to prior art devices which can be loud and noisy), and there are no exposed wires or hoses, and no harmful chemicals. The temperature in the cradle 20 is maintained at a constant temperature inside the room with the parents, allowing the parents to spend an extended period of time with the baby without requiring an adjustment in the temperature of the entire room. In the embodiments, the present invention can run constantly, or cycles on only as needed to maintain the desired temperature. The device thus provides parents and families a solid foundation to begin the grieving and healing process.

As seen in the Figures, in one exemplary embodiment, the invention comprises a mobile cart 10 with movement devices, such as wheels 12. The wheels 12 may be adjustable in height. Similarly, the cart 10 may be adjustable in length, width, and height. The cart 10 may be collapsible or foldable along one or more joints or connections. The cart 10 can include a frame 14 with a plurality of panels 16 positioned to contain the cooling unit 40. The panels can have integrated doors 18 and a vent 15. The frame can include one or more handles 13.

A bassinet 20, or cradle 20, operatively engages, such as sits proximate to, on or within, a cooler or evaporator 50 with base plate 30, which is part of and attached to a cooling unit 40. The cradle 20 includes a thermally conductive bottom 22 to facilitate the engagement to the cooling unit 40. The cooling unit 40 includes a compressor system 44 and condenser unit 46 and may comprise a condenser fan with filter dryer.

Temperature can be controlled with a thermostat 42, such as, but not limited to, a digital thermostat 42. The cooling unit 40 provides for an even temperature to be maintained in the bassinet 20, thereby trying to slow and reduce physical or visual changes occurring in the baby during the grieving process. In several embodiments, the thermostat is installed directly onto the base plate 30 of the evaporator 50 with one or more temperature sensors on or inside the bassinet 20 to ensure an exact and even environment. Temperature can be adjusted as desired, allowing maximum stability for the unit regardless of surrounding environmental conditions.

A drain pan may be placed below the evaporator base plate 30 to collect any type of moisture buildup from operation of the evaporator base plate 30 (such as from changes in temperature of the base plate 30, changes in temperature of the room, cycling of the thermostat 42, or shut-off of the unit). This prevents spillage of fluids in the room. A drain tube or pipe may be routed to the compressor unit 46, where moisture is evaporated due to heat from the compressor 44 and/or the evaporator 50, so that there is never any need to empty or drain the unit.

In another embodiment, the evaporator base plate 30 may be fixed in a permanent location (such as the top of a cabinet or table), with the bassinet 20 removably placed therein. The bassinet 20 also may be fixed in or on the evaporator base plate 30.

In several embodiments, the unit may use various types of Freon known in the market, or that may be developed in the future. In one embodiment, the freon used is R134a (1,1,1, 2-tetrafluoroethane), which is a single hydrofluorocarbon with no chlorine content and no ozone depletion potential. Other forms of coolant may be used.

The cart 10, or unit 10, or components thereof, may be easily reduced or expanded in size. The bassinet 20, for example, may be modified in length, width, height and depth as needed to accommodate babies of different sizes. The cart 10, as described above, also may be similarly modifiable in size and dimension. The cart 10 and bassinet 20 each may be independently modified as needed. Spring clips may be used along sides or joints of both, thereby allowing either the cart 10 or bassinet 20, to be expanded or reduced in dimension within seconds.

Thus, it is seen that the apparatus and methods disclosed herein achieve the ends and advantages previously mentioned. Numerous changes in the arrangement and construction of the parts and steps will be readily apparent to those skilled in the art, and are encompassed within the scope and spirit of the present disclosure. Further, the particular embodiments previously described are not intended to be construed as limitations upon the scope of this disclosure.

What is claimed is:

1. A device for maintaining a deceased fetus or infant at a temperature lower than ambient for extending preservation of the deceased fetus or infant, the device comprising:
   a frame having a top end and a bottom end;
   a cooling unit operatively attached to the frame and comprising a compressor system, a condenser unit, an evaporator including a cooling surface, and a thermostat;
   a cradle sized to contain the fetus or infant, operatively attached to the frame, and in thermal contact with the cooling surface; and
   a power supply conduit connected to the cooling unit.

2. The device of claim 1, wherein the frame is a mobile cart and includes movement devices positioned at the bottom end.

3. The device of claim 1, wherein the condenser unit includes a metal coil surrounded with a plurality of metal fins to dissipate heat.

4. The device of claim 3, wherein the metal coil is made of copper and the fins are made of aluminum.

5. The device of claim 1, wherein the cooling unit includes a drain pan.

6. The device of claim 1, wherein energy is transmitted through the power supply conduit to the cooling unit.

7. The device of claim 1, wherein the cradle includes a thermal conductive bottom section positioned to operatively engage a portion of the cooling unit.

8. The device of claim 1, wherein the cradle includes a cover.

9. The device of claim 1, further including at least one sensor positioned to determine the temperature in the cradle.

10. The device of claim 9, wherein the at least one sensor is positioned proximate to the cradle.

11. A device for maintaining a deceased fetus or infant at a temperature lower than ambient for extending preservation of the deceased fetus or infant, the device comprising:
- a frame having a top end and a bottom end and including movement devices positioned at the bottom end;
- a cooling unit operatively attached to the frame, the cooling unit including a compressor system, a condenser unit, an evaporator, and a thermostat, the evaporator including a base plate positioned to transmit thermal energy;
- a cradle sized to contain the fetus or infant, operatively attached to the frame, and including a thermal conductive bottom section thermally connected to the base plate of the cooling unit; and
- a power supply conduit connected to the cooling unit.

12. The device of claim 11, wherein the condenser unit includes a copper coil surrounded with a plurality of aluminum fins.

13. The device of claim 11, wherein the frame includes a plurality of panels positioned to contain the cooling unit.

14. The device of claim 11, wherein the cooling unit further includes a drain pan positioned proximate to the base plate.

15. The device of claim 11, further including at least one sensor operatively attached to the cradle to determine the temperature in the cradle.

16. A device for maintaining a deceased fetus or infant at a temperature lower than ambient, the device comprising:
- a mobile cart having a frame with a top end, a bottom end, movement devices positioned at the bottom end, and a plurality of panels positioned around the frame;
- a cooling unit operatively attached to the frame, the cooling unit including a compressor system, a condenser unit, an evaporator, a drain pan and a thermostat, the evaporator including a base plate positioned to transmit thermal energy;
- a cradle sized to contain the fetus or infant, operatively attached to the frame, and including a thermal conductive bottom section thermally connected to the base plate of the cooling unit; and
- a power supply conduit connected to the cooling unit.

17. The device of claim 16, wherein the power supply conduit is configured to transmit AC and DC current to the cooling unit.

* * * * *